May 8, 1956  S. KUHLMAN  2,744,323
SHEARS
Filed Sept. 3, 1953
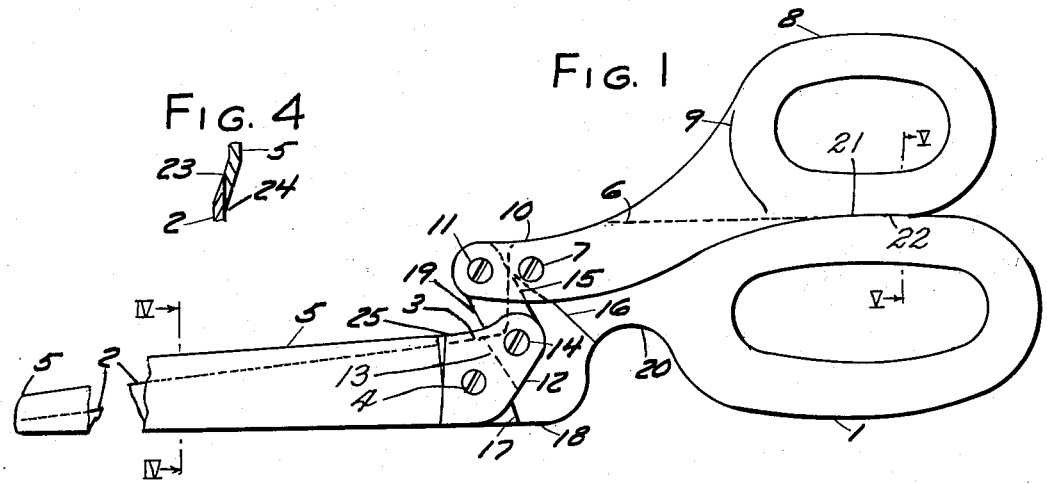
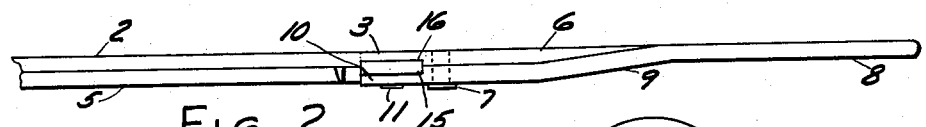
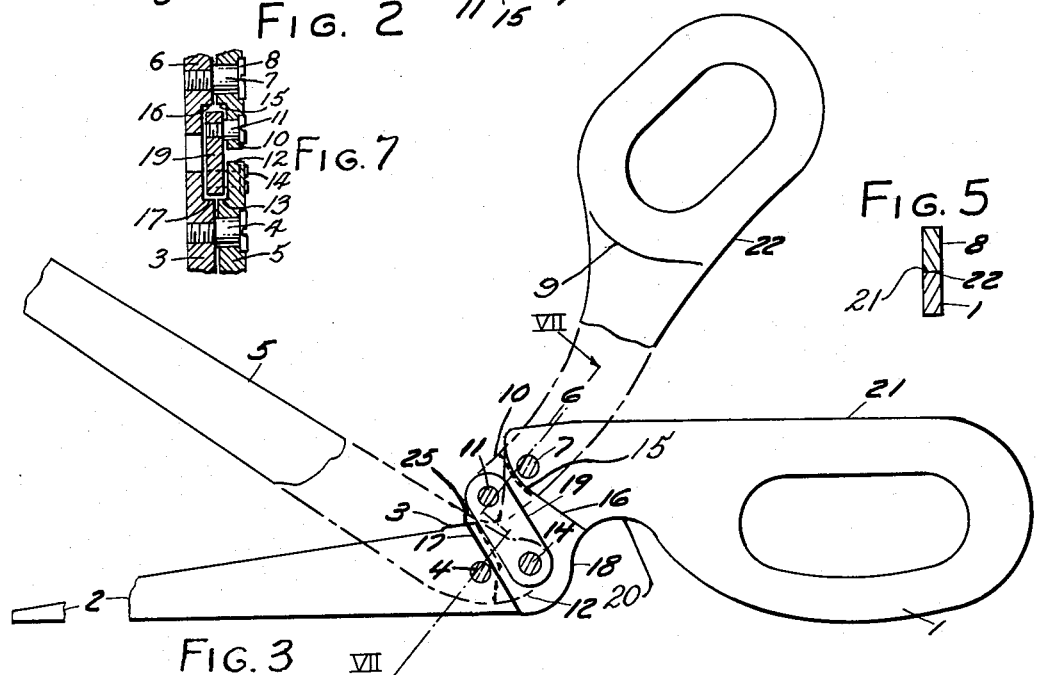
STANLEY KUHLMAN
Inventor
Geo E Kirk
Atty.

United States Patent Office 2,744,323
Patented May 8, 1956

2,744,323
SHEARS
Stanley Kuhlman, Toledo, Ohio
Application September 3, 1953, Serial No. 378,273
1 Claim. (Cl. 30—251)

This invention relates to scissor type of cutting implements wherein normally one blade may be directed for approximately planar or straight line progress with the sheet material to be cut and the other or complementary blade is oscillated relatively thereto.

This invention has utility when incorporated in a hand tool of one hand type wherein there is a blade fixed or integral with the finger receiving portion of the handle. This is the primary blade-handle portion which has directly pivoted thereto both a complementary blade and a thumb actuating handle portion. A fourth element or link directly connects the second element blade and the third element handle portion. In the operation of the tool, it is advantageous to direct the first element of integral handle and blade for straight line movement, as directly under the material or sheet stock to be cut, with the second element blade above or on the opposite side of the sheet stock and oscillated toward the first element blade by moving the third element handle toward the first element handle.

Referring to the drawings:

Fig. 1 is a side elevation of an embodiment of the invention, parts being broken away, with the part of the outline of the major element hidden by the other elements being shown in dotted lines;

Fig. 2 is an on edge or plan view of the major part of the tool of Fig. 1;

Fig. 3 is a view similar to Fig. 1, but with the blades open or spread apart with portions removed and shown in dot-dash lines to permit a full line showing of other portions;

Fig. 4 is a section on the line IV—IV, Fig. 1, showing the complementary blades of the tool in register relation;

Fig. 5 is a section on the line V—V, Fig. 1, showing the abutting or stop relation for the closed tool;

Fig. 6 is an enlarged detail of a pivot screw employed in the tool assembly; and Fig. 7 is an enlarged section taken along line VII—VII Fig. 3 showing the relationship of the link in the groove and notches of the elements and the pivots of the shears of this invention.

The tool, as disclosed, embodies as a major or first element a finger-seat-providing handle portion 1, and remote therefrom a primary blade portion 2. Near base portion 3 of the blade 2 is a pivot pin 4 having a long lever arm or complementary movable blade 5 extending therefrom.

A base portion 6 extending from the handle 1 has a second pivot pin 7 providing a mounting for a lever having a longer arm or thumb-seat-providing handle portion 8 complementary to the handle 1. From the thumb portion 8 of this handle there extends angularly forwardly (Fig. 2) an offset 9 extending to the pivot pin 7, which offset has a short shallow or notched portion forwardly of pivot pin 7 constituting a lever arm 10 approximately co-planar with the blade 5.

At the free end of the lever arm 10 is a pivot pin 11. The movable blade 5 past its pivot bearing 4 has a short shallow or notched portion constituting an arm 12 having a shoulder 13 reducing the thickness of the arm 12 to a free end thinner or more shallow than the main body of the blade 5, said free end mounting a pivot pin 14. A shoulder 15 of handle 8 coacts to provide a notched or more shallow or thinner free end constituting the lever arm 10 at the pivot bearing 11. Shoulders 16, 17, between the base portions 3, 6, of the major element 1, 2, locate therebetween a thinner or more shallow face region or groove 18. A link 19 connects the pivot pins 11, 14, in the clearance provided by the notches at shoulders 13 and 15 and groove 18.

Should the tool operator prefer not to have the index finger in the handle hole in seat 1, there is provided a notch or clearway at a region 20 therefor. With thumb in the handle 8 and fingers in the handle 1, a grasping or squeezing action pulls these portions to cause stop portions 21, 22 to abut (Fig. 1). Through the link 19, the stationary blade 2 then has its cutting edge 23 held against the cutting edge 24 of the blade 5, riding therepast in effecting a shearing operation.

The showing is of a right hand tool which is loose enough for the manual action of one's thumb thrust to urge the handle 8 in the spread apart or open position, which easy action is affected by the offset bearing type of pivot screws or pins shown in Fig. 6. This tends to deflect the short arm 10 to shift toward the clearance or groove 18 and carry therewith the upper end of the link 19. Inasmuch as this is a tilting action for the link 19, the lower end of this link tends to move through the groove 18 and carry with it the short arm 12 of the lever 5, 12. Thus in practice there is this right handed grasping efficient functioning of this tool, due to lost motion take-up effective for holding the blade 5 cutting edge 24 to ride snugly toward and in register past the cutting edge 23 of the blade 2. While the stops 21, 22, determine the overlap register for the cutting edges 23, 24, there may be a limit for fully open position of the tool by an abutment at region 25 between the shoulder 13 of lever 5, 12 and the side edge of the link 19.

For a left hand type of tool hereunder, such is the converse of the showing here, as for the link assembly and the connections thereto on the opposite face or side of the major element 1, 2.

Special utility for the shears of this invention is for cutting patterns, as for dresses, bandages, as well as working in more rigid sheet material, as for tin snips. In this type of operation, the primary blade 2 and remote handle 1 may be considered as a relatively stationary structure. Complementary or secondary relatively movable transmission structure is the system of two first class levers 8, 10; 12, 5, having the link 19 rendering such system continuous. The two first class levers are independently pivoted directly to the major structure 1, 2, toward the handle 1 from the blade 2. The connecting floating link 19 is between the short arms of these two levers and is independent of direct connection to the major or stationary element 1, 2. The lever fulcra 7, 4, are toward the cutting elements or blades from the handle grips 1, 8.

What is claimed and it is desired to secure by Letters Patent is:

A pair of shears comprising: a unitary relatively stationary member having a cutting edge portion and a handle portion with a susbtantially transverse groove between said handle and said cutting edge portion, a pair of pivot pins mounted on opposite sides and ends of said groove, a movable member having a cutting edge, said member being pivoted near one of its ends on the pivot mounted on the cutting portion side of said groove, a third pivot pin mounted at said one end of said movable cutting member with said one end being notched opposite said groove, a movable handle pivoted near one of its ends on said pivot pin mounted on the handle portion side of said groove, a forth pivot pin mounted at said one end of said movable handle with said one end being notched opposite said groove, and a link located in said groove and said notches and connected to said third and fourth pivot pins, whereby movement of said movable handle away from said stationary handle portion moves said movable cutting edge away from said stationary cutting edge and vice versa.

References Cited in the file of this patent

UNITED STATES PATENTS

| | | |
|---|---|---|
| 173,010 | Humphries | Feb. 1, 1876 |
| 192,426 | Folty et al. | June 26, 1877 |
| 2,442,424 | McGary et al. | June 1, 1948 |
| 2,579,272 | Ralston | Dec. 18, 1951 |